United States Patent
Li et al.

(10) Patent No.: US 11,962,395 B1
(45) Date of Patent: Apr. 16, 2024

(54) WHOLE-AIRSPACE SATELLITE SEARCH METHOD AND DEVICE BASED ON PHASED ARRAY ANTENNA

(71) Applicant: China Starwin Science & Technology Co., Ltd, Chengdu (CN)

(72) Inventors: Qingan Li, Chengdu (CN); Kesong Wu, Chengdu (CN); Zhiqiang Zhang, Chengdu (CN); Hansong Du, Chengdu (CN)

(73) Assignee: CHINA STARWIN SCIENCE & TECHNOLOGY CO., LTD, Chengdu (CN)

( * ) Notice: Subject to any disclaimer, the term of this patent is extended or adjusted under 35 U.S.C. 154(b) by 0 days.

(21) Appl. No.: 18/242,540

(22) Filed: Sep. 6, 2023

(30) Foreign Application Priority Data

Jun. 28, 2023 (CN) .......................... 202310774087.7

(51) Int. Cl.
*H01Q 3/02* (2006.01)
*H01Q 3/26* (2006.01)
*H04B 7/185* (2006.01)

(52) U.S. Cl.
CPC ........... *H04B 7/18547* (2013.01); *H01Q 3/02* (2013.01); *H01Q 3/2611* (2013.01)

(58) Field of Classification Search
CPC ..... H01Q 3/02; H01Q 3/2611; H04B 7/18547
See application file for complete search history.

(56) References Cited

U.S. PATENT DOCUMENTS

| | | | |
|---|---|---|---|
| 6,191,734 B1 * | 2/2001 | Park | H01Q 3/06 342/359 |
| 10,483,629 B1 * | 11/2019 | Silva | H01Q 3/2605 |
| 2009/0315760 A1 * | 12/2009 | Mousavi Bafrooei | H01Q 1/3275 342/359 |
| 2014/0313073 A1 * | 10/2014 | DiNallo | H04B 7/18517 342/368 |
| 2022/0416846 A1 * | 12/2022 | Merrell | H04B 7/043 |

FOREIGN PATENT DOCUMENTS

| | | |
|---|---|---|
| CN | 113219873 A | 8/2021 |
| CN | 113701753 A | 11/2021 |
| CN | 113890598 A | 1/2022 |
| CN | 114583451 A | 6/2022 |

* cited by examiner

*Primary Examiner* — Awat M Salih
(74) *Attorney, Agent, or Firm* — Bayramoglu Law Offices LLC

(57) ABSTRACT

A whole-airspace satellite search method and device based on a phased array antenna are provided. The present disclosure combines electronic scanning implemented by the phased array antenna with mechanical scanning implemented by a mechanical actuator. As for low-orbit satellite communication, the present disclosure achieves rapid search and aiming through the phased array antenna, and solves the problem of limited electronic scanning angle of the phased array antenna through a servo system of the mechanical actuator. On the other hand, the present disclosure supports whole-airspace search and aiming of high, medium, and low-orbit satellites through the combination of the electronic scanning implemented by the phased array antenna and the mechanical scanning implemented by the mechanical actuator.

16 Claims, 2 Drawing Sheets

WHOLE-AIRSPACE SATELLITE SEARCH METHOD AND DEVICE BASED ON PHASED ARRAY ANTENNA

CROSS REFERENCE TO THE RELATED APPLICATIONS

This application is based upon and claims priority to Chinese Patent Application No. 2023107740877, filed on Jun. 28, 2023, the entire contents of which are incorporated herein by reference.

TECHNICAL FIELD

The present disclosure belongs to the technical field of satellite communications, and specifically relates to a whole-airspace satellite search method and device based on a phased array antenna.

BACKGROUND

The high-throughput satellite (HTS) geostationary earth orbit (GEO), low earth orbit (LEO), and medium earth orbit (MEO) are rapidly developing globally. The global communication industry needs more software-defined and flexibly configurable intelligent satellite communication terminals to suit the urgent needs of various user terminals for the rapid development of satellite internet and fifth/sixth-generation (5G/6G) mobile communication industries. Satellite communication has become a major means of communication in today's society, and satellite communication equipment plays an important role in fields such as public emergency handling, emergency command, and real-time information transmission.

In the field of satellite communication, for traditional servo antennas, beam pointing and scanning mainly rely on mechanical servo control, resulting in slow beam switching time and inability to achieve fast target tracking. The phased array antenna implements electronic scanning, which can quickly respond to beam switching, and can quickly complete multi-angle scanning in the airspace, thereby achieving fast target tracking with the advantage of beam pattern agility. However, the pointing and scanning range of phased array antennas is usually within ±600 of the normal direction. When a ship as the carrier shakes, the pointing range of the phased array antenna will further shrink, making it unsuitable for large-scale movement tracking of low-orbit satellites. Therefore, the prior art does not support whole-airspace search for high, medium, and low-orbit satellites, and needs further improvement.

SUMMARY

An objective of the present disclosure is to propose a whole-airspace satellite search method and device based on a phased array antenna. The present disclosure solves the problem that the existing phased array antenna does not support whole-airspace search of high, medium, and low-orbit satellites and takes a long time to search and aim the satellite after startup.

The present disclosure adopts the following technical solutions. A first aspect of the present disclosure provides a whole-airspace satellite search method based on a phased array antenna, including the following steps:

S1: initializing the phased array antenna, and controlling an array surface of the phased array antenna to a horizontal direction;

S2: calculating an angle to aim a satellite at a place where the phased array antenna is located;

S3: combining attitude data of the array surface of the phased array antenna; and calculating, based on the angle to aim the satellite at the place where the phased array antenna is located, a beam angle of the phased array antenna;

S4: deploying the phased array antenna based on the beam angle; determining whether the phased array antenna receives a valid signal; if yes, proceeding to step S6; and if not, proceeding to step S5;

S5: controlling the phased array antenna to perform offset scanning, and returning to step S3;

S6: recording a beam azimuth angle and a beam off-axis angle corresponding to a maximum signal strength, and proceeding to step S7;

S7: calculating an azimuth compensation angle and a pitch compensation angle based on the beam azimuth angle and the beam off-axis angle corresponding to the maximum signal strength; and S8: driving, based on the azimuth compensation angle and the pitch compensation angle, the phased array antenna to aim the satellite.

Further, in step S2, the angle to aim the satellite at the place where the phased array antenna is located includes an azimuth angle $\varphi_0$, a pitch angle $\theta_0$, and a polarization angle $\rho_0$:

$$\varphi_0 = 180° + \tan^{-1}\left(\frac{\tan(\lambda_s - \lambda_e)}{\sin\varphi_e}\right)$$

$$\theta_0 = \tan^{-1}\left(\frac{\cos(\lambda_s - \lambda_e)\cos\varphi_e - \frac{R_e}{R_e + H}}{\sqrt{1 - (\cos(\lambda_s - \lambda_e)\cos\varphi_e)2}}\right)$$

$$\rho_0 = \tan^{-1}\left(\frac{\sin(\lambda_s - \lambda_e)}{\tan\varphi_e}\right)$$

where, $\lambda_s$ denotes a longitude of the satellite; $\lambda_e$ denotes a longitude of the phased array antenna; $\varphi_e$ denotes a latitude of the phased array antenna; $R_e$ denotes an average radius of the Earth; and H denotes a distance of the satellite from a surface of the Earth.

Further, step S3 includes the following sub-steps:

S31: fixing an inertial navigation device on the array surface of the phased array antenna, and acquiring the attitude data of the array surface of the phased array antenna in an attitude reference frame of the inertial navigation device, including a roll angle $\alpha$, a pitch angle $\beta$, and a yaw angle $\gamma$;

S32: calculating, based on the attitude data of the array surface of the phased array antenna in the attitude reference frame of the inertial navigation device, a pointing angle of an aiming beam; and S33: converting the pointing angle of the aiming beam into the beam angle of the phased array antenna.

Further, step S32 includes the following sub-steps:

S321: converting the attitude data of the array surface of the phased array antenna in the attitude reference frame of the inertial navigation device into attitude data in a north-east-down (NED) frame according to the following rotation matrixes:

$$C_x(\alpha) = \begin{bmatrix} 1 & 0 & 0 \\ 0 & \cos\alpha & \sin\alpha \\ 0 & -\sin\alpha & \cos\alpha \end{bmatrix}$$

$$C_y(\beta) = \begin{bmatrix} \cos\beta & 0 & -\sin\beta \\ 0 & 1 & 0 \\ \sin\beta & 0 & \cos\beta \end{bmatrix}$$

$$C_z(\gamma) = \begin{bmatrix} \cos\gamma & \sin\gamma & 0 \\ -\sin\gamma & \cos\gamma & 0 \\ 0 & 0 & 1 \end{bmatrix}$$

where, $C_x(\alpha)$, $C_y(\beta)$, and $C_z(\gamma)$ denote the rotation matrixes around an x-axis, a y-axis, and a z-axis, respectively;

S322: acquiring, based on the attitude data of the array surface of the phased array antenna in the NED frame, an attitude vector of the array surface of the phased array antenna in the NED frame;

S323: acquiring, by a satellite locator, a current position of the array surface of the phased array antenna; and acquiring, based on the current position of the array surface of the phased array antenna, a first coordinate vector $\vec{a}$ of the array surface of the phased array antenna in a geocentric coordinate system;

S324: acquiring, by a satellite communications on the move (SOTM) modem, a current position of a target satellite; and acquiring, based on the current position of the target satellite, a second coordinate vector $\vec{b}$ of the target satellite in the geocentric coordinate system;

S325: calculating, based on the first coordinate vector $\vec{a}$ and the second coordinate vector $\vec{b}$, a target vector $\vec{c} = \vec{b} - \vec{a}$;

S326: performing, based on the attitude vector of the array surface of the phased array antenna in the NED frame, coordinate transformation on the target vector c to acquire a pitch angle error value $\Delta\beta$ and a yaw angle error value $\Delta\gamma$ to be adjusted by the phased array antenna; and S327: performing, based on the pitch angle error value $\Delta\beta$ and the yaw angle error value $\Delta\gamma$, error reduction control on a pitch motor and an azimuth motor, respectively; and updating to acquire the pointing angle of the aiming beam.

Further, in step S327, the pointing angle of the aiming beam includes an azimuth angle $\varphi_1$ and a pitch angle $\theta_1$ of the phased array antenna in the NED frame:

$$\varphi_1 = \varphi_0 + \Delta\gamma$$

Further, in step S33, the beam angle of the phased array antenna includes an azimuth angle $\varphi_2$, a pitch angle $\theta_2$, and a polarization angle $\rho_2$:

$$\varphi_2 = \varphi_1$$
$$\theta_2 = \theta_1$$
$$\rho_2 = \arctan\left(\frac{\sin\rho_n}{\cos\theta_2 \cdot \cos\rho_n}\right)$$

where, $\rho_n$ denotes a polarization angle of the phased array antenna in a normal direction.

Further, step S5 includes the following sub-steps:

S51: offsetting the pitch angle by multiple beam widths;

S52: controlling the phased array antenna for electronic 360° azimuth scanning;

S53: determining whether a valid signal is scanned by preset n times of electronic 360° azimuth scanning; if yes, returning to step S3; and if not, proceeding to step S54; and S54: controlling the pitch motor to raise the array surface of the phased array antenna to 45°; controlling the azimuth motor to rotate 360° for the electronic 360° azimuth scanning, so as to perform whole-airspace scanning; and returning to step S3 if a valid signal is scanned.

Further, step S54 further includes: calculating a beam width BB, of a scanning angle at different off-axis angles during the whole-airspace scanning:

$$\theta_{Bw} = \frac{k\lambda}{Nd \cdot \cos\psi}$$

where, k denotes a beam width factor; $\lambda$ denotes a wavelength; N denotes a number of array elements in the phased array antenna; d denotes a center distance between two array elements; and $\psi$ denotes the off-axis angle of the phased array antenna; and calculating a beam width $r_1$ of the scanning angle at different yaw angles:

$$r_1 = a \cdot b \sqrt{a^2 \sin^2\gamma + b^2 \cos^2\gamma}$$

where, a and b respectively denote lengths of two axes of an ellipse formed by fitting the beam width; and $\gamma$ denotes the yaw angle of the phased array antenna.

Further, step S7 further includes: performing a subtraction operation between the beam azimuth angle corresponding to the maximum signal strength and the yaw angle of the array surface of the phased array antenna in the attitude reference frame of the inertial navigation device to acquire the azimuth compensation angle; and performing a subtraction operation between the beam off-axis angle corresponding to the maximum signal strength and the pitch angle of the array surface of the phased array antenna in the attitude reference frame of the inertial navigation device to acquire the pitch compensation angle.

A second aspect of the present disclosure further provides a whole-airspace satellite search device based on a phased array antenna, for implementing the whole-airspace satellite search method based on a phased array antenna.

The present disclosure has following beneficial effects:

(1) The present disclosure combines the electronic scanning implemented by the phased array antenna with the mechanical scanning implemented by a mechanical actuator. As for low-orbit satellite communication, the present disclosure achieves rapid search and aiming through the phased array antenna, and solves the problem of limited electronic scanning angle of the phased array antenna through a servo system of the mechanical actuator. On the other hand, the present disclosure supports whole-airspace search and aiming of high, medium, and low-orbit satellites through the combination of the electronic scanning implemented by the phased array antenna and the mechanical scanning implemented by the mechanical actuator.

(2) The present disclosure features a simple search logic, easy implementation, and high search efficiency.

(3) The present disclosure fixes the inertial navigation device on the array surface of the phased array antenna to better detect the attitude of the moving array surface and reduce mechanical errors. Compared with other prior art that use multiple motion sensing units, the present disclosure has the advantages of lower cost, simpler and more accurate data acquisition and control, and lower power consumption.

DETAILED DESCRIPTION OF THE EMBODIMENTS

Figure 1:
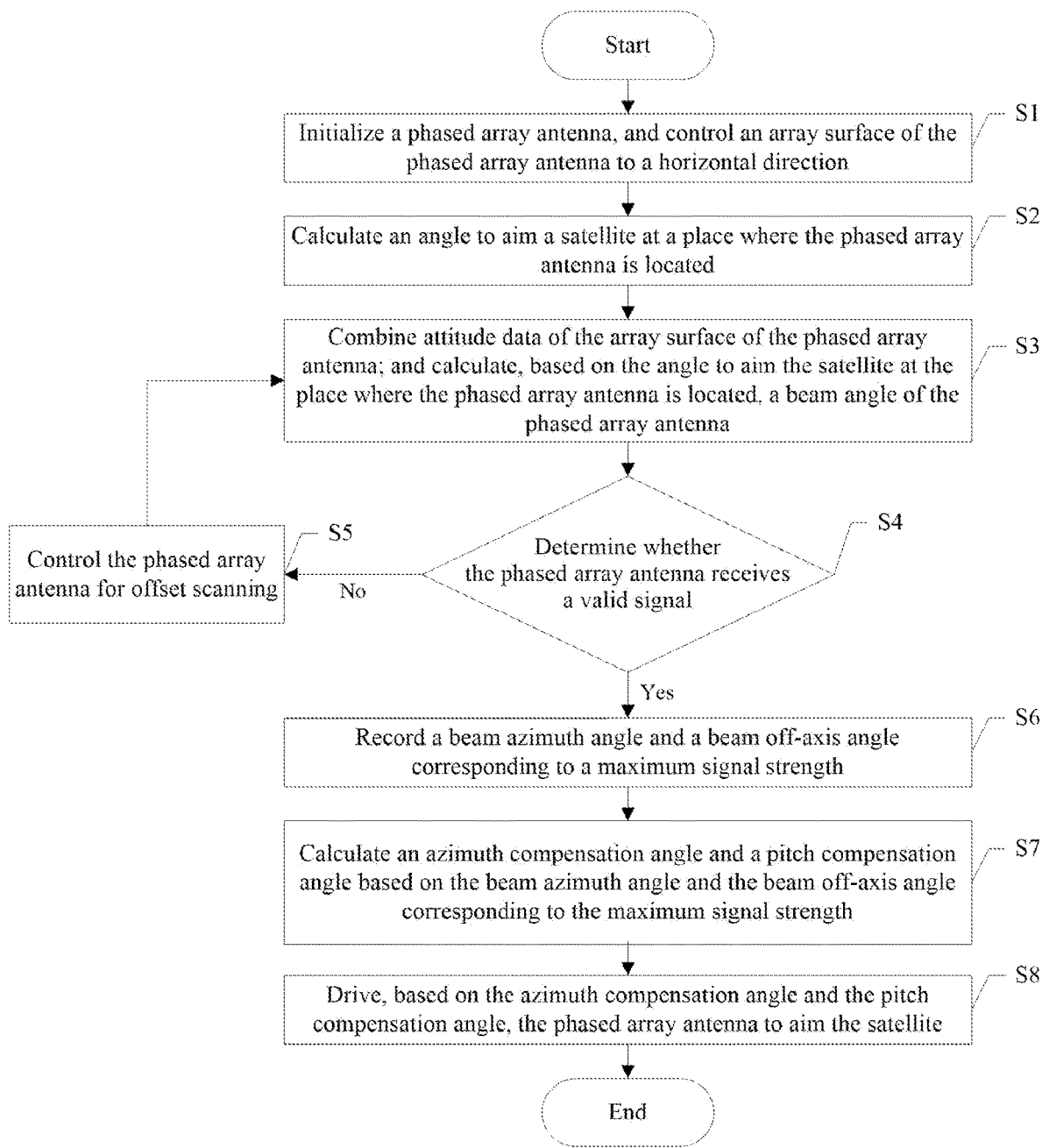
FIG. 1 is a flowchart of a whole-airspace satellite search method based on a phased array antenna according to an embodiment of the present disclosure.

The exemplary implementations of the present disclosure are described below with reference to the drawings. It should be understood that the implementations shown in the drawings are merely exemplary, and are intended to illustrate the principle and spirit of the present disclosure, rather than to limit the scope of the present disclosure.

Embodiment 1

The embodiment of the present disclosure provides a whole-airspace satellite search method based on a phased array antenna. As shown in FIG. 1, the method includes steps S1 to S8.

S1. The phased array antenna is initialized, and an array surface of the phased array antenna is controlled to a horizontal direction.

In the embodiment of the present disclosure, the initialization of the phased array antenna includes processes such as self-checking and default parameter configuration of a built-in program of the phased array antenna.

In the embodiment of the present disclosure, the horizontal direction is used as a default initial direction for adjusting and controlling the array surface of the phased array antenna. In the prior art, 45° or other angles are used as a default starting point of an initial direction for adjustment and control. Compared with the prior art, the embodiment of the present disclosure has a shorter search cycle and higher search efficiency.

S2. An angle to aim a satellite at a place where the phased array antenna is located is calculated.

In the embodiment of the present disclosure, the angle to aim the satellite at the place where the phased array antenna is located includes azimuth angle $\varphi_0$, pitch angle $\theta_0$, and polarization angle $\rho_0$:

$$\varphi_0 = 180° + \tan^{-1}\left(\frac{\tan(\lambda_s - \lambda_e)}{\sin\varphi_e}\right)$$

$$\theta_0 = \tan^{-1}\left(\frac{\cos(\lambda_s - \lambda_e)\cos\varphi_e - \frac{R_e}{R_e + H}}{\sqrt{1 - (\cos(\lambda_s - \lambda_e)\cos\varphi_e)^2}}\right)$$

$$\rho_0 = \tan^{-1}\left(\frac{\sin(\lambda_s - \lambda_e)}{\tan\varphi_e}\right)$$

where, $\lambda_s$ denotes a longitude of the satellite; $\lambda_e$ denotes a longitude of the phased array antenna; $\varphi_e$ denotes a latitude of the phased array antenna; $R_e$ denotes an average radius of the Earth; and H denotes a distance of the satellite from a surface of the Earth.

S3. Attitude data of the array surface of the phased array antenna are combined, and based on the angle to aim the satellite at the place where the phased array antenna is located, a beam angle of the phased array antenna is calculated.

In the embodiment of the present disclosure, step S3 includes sub-steps S31 to S33.

S31. An inertial navigation device (system) is fixed on the array surface of the phased array antenna, and the attitude data of the array surface of the phased array antenna in an attitude reference frame of the inertial navigation device are acquired, including roll angle α, pitch angle β, and yaw angle γ.

In the embodiment of the present disclosure, the inertial navigation device is fixed on the array surface of the phased array antenna to reduce mechanical errors.

S32. Based on the attitude data of the array surface of the phased array antenna in the attitude reference frame of the inertial navigation device, a pointing angle of an aiming beam is calculated.

In the embodiment of the present disclosure, step S32 includes sub-steps S321 to S327.

S321. The attitude data of the array surface of the phased array antenna in the attitude reference frame of the inertial navigation device are converted into attitude data in a north-east-down (NED) frame according to the following rotation matrixes. It is assumed that the roll angle is α, the pitch angle is β, and the yaw angle is γ.

$$C_x(\alpha) = \begin{bmatrix} 1 & 0 & 0 \\ 0 & \cos\alpha & \sin\alpha \\ 0 & -\sin\alpha & \cos\alpha \end{bmatrix}$$

$$C_y(\beta) = \begin{bmatrix} \cos\beta & 0 & -\sin\beta \\ 0 & 1 & 0 \\ \sin\beta & 0 & \cos\beta \end{bmatrix}$$

$$C_z(\gamma) = \begin{bmatrix} \cos\gamma & \sin\gamma & 0 \\ -\sin\gamma & \cos\gamma & 0 \\ 0 & 0 & 1 \end{bmatrix}$$

where, $C_x(\alpha)$, $C_y(\beta)$, and $C_z(\gamma)$ denote the rotation matrixes around an x-axis, a y-axis, and a z-axis, respectively.

S322. Based on the attitude data of the array surface of the phased array antenna in the NED frame, an attitude vector of the array surface of the phased array antenna in the NED frame is acquired.

In the embodiment of the present disclosure, it is assumed that the attitude of the array surface of the phased array antenna in the attitude reference frame of the inertial navigation device is A. The attitude A can be switched to attitude B in the NED frame through the rotation matrixes of step S321. According to α, β, and γ, the attitude vector in the NED frame can be acquired.

S323. A current position (longitude, latitude, and altitude) of the array surface of the phased array antenna is acquired by a satellite locator, and based on the current position of the array surface of the phased array antenna, first coordinate vector a of the array surface of the phased array antenna in a geocentric coordinate system is acquired.

In the embodiment of the present disclosure, in order to avoid signal interference, the satellite locator is fixed on a carrier of the array surface of the phased array antenna and away from the array surface of the phased array antenna.

S324. A current position of a target satellite is acquired by a satellite communications on the move (SOTM) modem, and based on the current position (longitude, latitude, and altitude) of the target satellite, second coordinate vector $\vec{b}$ of the target satellite in the geocentric coordinate system is acquired.

S325. Based on the first coordinate vector $\vec{a}$ and the second coordinate vector $\vec{b}$, target vector $\vec{c} = \vec{b} - \vec{a}$ is acquired.

S326. Based on the attitude vector of the array surface of the phased array antenna in the NED frame, coordinate transformation is performed on the target vector c to acquire pitch angle error value $\Delta\beta$ and yaw angle error value $\Delta\gamma$ to be adjusted by the phased array antenna.

In the embodiment of the present disclosure, since the phased array antenna points to the satellite, the pitch angle error value $\Delta\beta$ and yaw angle error value $\Delta\gamma$ to be adjusted by the phased array antenna can be acquired according to a trigonometric functions projection relationship.

S327. Based on the pitch angle error value $\Delta\beta$ and the yaw angle error value $\Delta\gamma$, error reduction control is performed on a pitch motor and an azimuth motor, respectively, and updating is performed to acquire the pointing angle of the aiming beam.

In the embodiment of the present disclosure, the pointing angle of the aiming beam includes an azimuth angle $\varphi_1$ and a pitch angle $\theta_1$ of the phased array antenna in the NED frame:

$$\varphi_1 = \varphi_0 + \Delta\gamma$$

$$\theta_1 = \theta_0 + \Delta\beta$$

S33. The pointing angle of the aiming beam is converted into the beam angle of the phased array antenna.

In the embodiment of the present disclosure, the beam angle of the phased array antenna includes azimuth angle $\varphi_2$, pitch angle $\theta_2$, and polarization angle $\rho_2$:

$$\varphi_2 = \varphi_1$$

$$\theta_2 = \theta_1$$

$$\rho_2 = \arctan\left(\frac{\sin\rho_n}{\cos\theta_2 \cdot \cos\rho_n}\right)$$

where, $\rho_n$ denotes a polarization angle of the phased array antenna in a normal direction.

Unlike ordinary planar antennas, the phased array antenna is not normal to the satellite, so its polarization angle cannot be calculated based on a normal polarization angle. A normal polarization line can be projected onto a horizontal plane (i.e. the plane where the array surface of the phased array antenna is located). In the normal direction, the polarization angle is an angle between the normal polarization line and the x-axis. For the array surface of the phased array antenna, the polarization line is an angle between a horizontal polarization line and the x-axis.

S4. The phased array antenna is deployed based on the beam angle. It is determined whether the phased array antenna receives a valid signal. If yes, the operation proceeds to step S6; and if not, the operation proceeds to step S5.

S5. The phased array antenna is controlled to perform offset scanning, and the operation proceeds returns to step S3.

Figure 2:
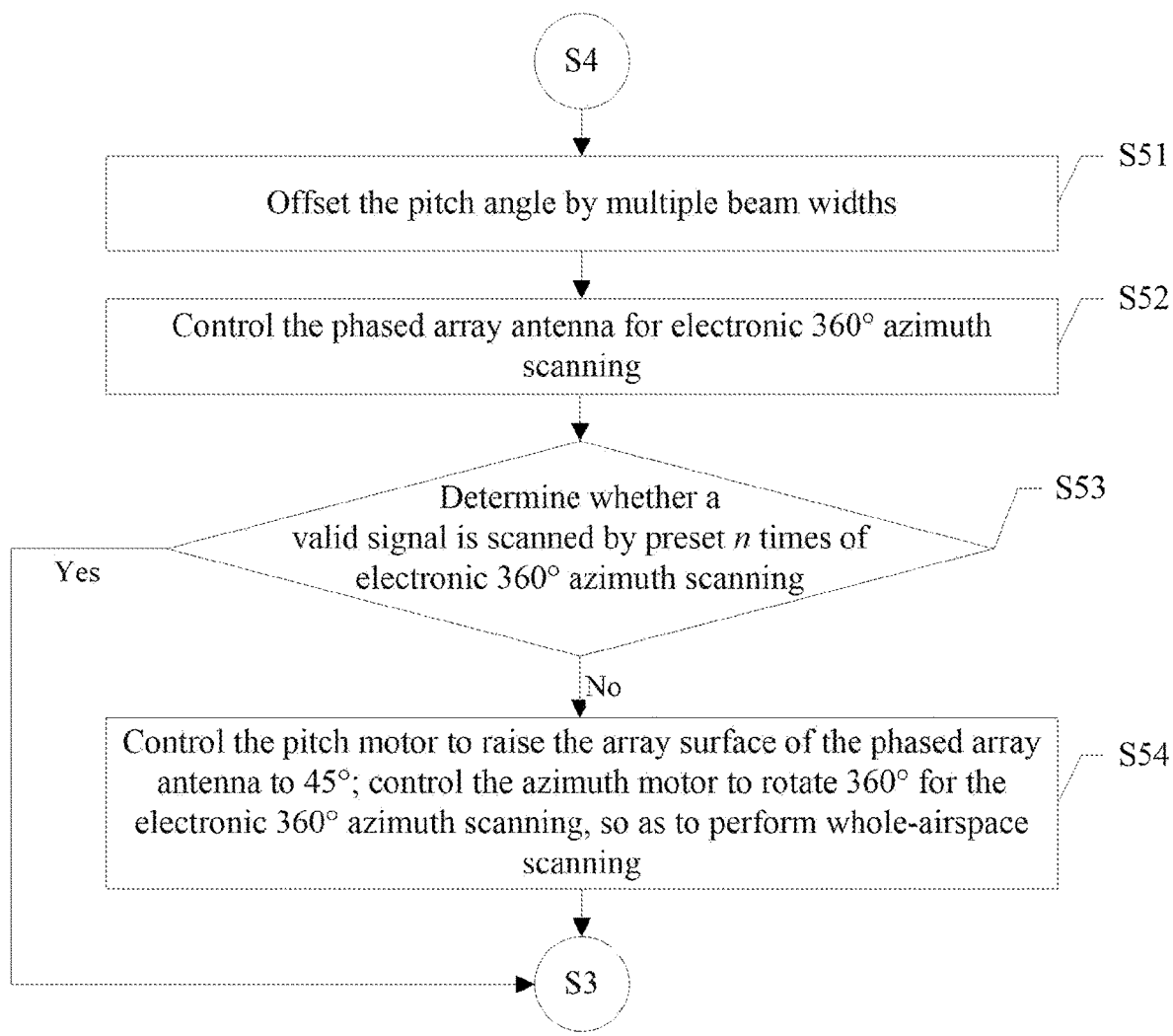
FIG. 2 is a flowchart of step S5 of the whole-airspace satellite search method according to an embodiment of the present disclosure.

As shown in FIG. 2, in the embodiment of the present disclosure, step S5 includes sub-steps S51 to S54.

S51. The pitch angle is offset by multiple beam widths.

In the embodiment of the present disclosure, the multiple beam widths are determined based on actual data such as the size of the array surface of the phased array antenna, the beam width, and the orbital altitude of the target satellite. The multiple beam widths may be less than one beam width, or greater than or equal to one beam width. In addition, preferably, the pitch offset direction is a direction of increasing the pitch angle.

S52. The phased array antenna is controlled for electronic 360° azimuth scanning.

In the embodiment of the present disclosure, the electronic scanning is a commonly used term in the art, which refers to the scanning of electromagnetic energy in an electronic scanning zone by adjusting the phase to change the antenna direction.

S53. It is determined whether a valid signal is scanned by preset n (preferably 5 in the embodiment of the present disclosure) times of electronic 360° azimuth scanning. If yes, the operation returns to step S3 to combine the attitude data to calculate the beam angle of the antenna. If not, the operation proceeds to step S54.

If no valid signal is found after the preset n times of electronic 360° azimuth scanning, it indicates that the target satellite cannot be searched solely by electronic scanning. It is necessary to combine mechanical scanning with electronic scanning to achieve whole-airspace scanning. In the embodiment of the present disclosure, mechanical scanning refers to the scanning of a specific space by changing the pitch angle and the azimuth angle of the array surface of the phased array antenna through a mechanical actuator to change the antenna direction. In a blind spot of electronic scanning, the mechanical actuator cooperates to output an additional pitch angle and azimuth angle for adjustment, thus achieving whole-airspace scanning.

S54. The pitch motor is controlled to raise the array surface of the phased array antenna to 45°. The azimuth motor is controlled to rotate 3600 for the electronic 360° azimuth scanning, so as to perform whole-airspace scanning. The operation returns to step S3 if a valid signal is scanned. Based on the recorded data, namely the pitch angle and the azimuth angle of the array surface of the phased array antenna, and the azimuth angle and pitch angle of electronic scanning, the attitude data is re fused to calculate the beam angle of the phased array antenna.

In the embodiment of the present disclosure, the pitch angle of the phased array antenna is raised to 450 by the mechanical actuator (preferably a servo motor). In the best case, the reception capacity of the array surface of the phased array antenna can be increased by 40%.

After the pitch motor is raised to a certain angle, the azimuth motor rotates 360°, and the off-axis angle and the yaw angle during beam scanning change. The beam width of the scanning angle is calculated based on different off-axis angles and yaw angles, taking $\frac{1}{10}$ of the beam width as the scanning angle. The azimuth motor cooperates for signal scanning to acquire directional information of signals.

In the embodiment of the present disclosure, as for the beam width of the scanning angle at different off-axis angles, in order to reduce signal fluctuations and quickly find the maximum value of the signal during the scanning process, it is necessary to calculate the beam width at different azimuth angles and off-axis angles based on the shape of the array surface. Due to the different shapes of different array surfaces of the phased array antenna, the beam widths in different directions vary. Generally, the beam width at a half power point is taken as the beam width of the phased array antenna, and a 3 dB width $BB_w$ of a single linear array is calculated as follows:

$$\theta_{Bw} = \frac{k\lambda}{Nd \cdot \cos\psi}$$

where, k denotes a beam width factor, with a 3 dB beam width factor being 0.886; $\lambda$ denotes a wavelength; N denotes a number of array elements in the phased array antenna; d denotes a center distance between two array elements; and ψ denotes the off-axis angle of the phased array antenna. The off-axis angle and the pitch angle are complementary, and Nd is equivalent to a side length of the array surface.

In the embodiment of the present disclosure, as for the beam width of the scanning angle at different yaw angles, as a normal array surface is generally rectangular or square, the beam width corresponding to different side lengths is different. Therefore, the beam width can be fitted into an ellipse to calculate it at different azimuth angles. A major axis of the ellipse corresponds to the beam width of a short side of the array surface, while a minor axis of the ellipse corresponds to the beam width of a long side of the array surface. The beam width in different directions can be understood as curvature radius $r_1$ of the ellipse.

$$r_1 = a \cdot b \sqrt{a^2 \sin^2 \gamma + b^2 \cos^2 \gamma}$$

where, a and b respectively denote lengths of two axes of an ellipse formed by fitting the beam width; and γ denotes the yaw angle of the phased array antenna.

S6. A beam azimuth angle and a beam off-axis angle corresponding to a maximum signal strength are recorded, and the operation proceeds to step S7.

S7. An azimuth compensation angle and a pitch compensation angle are calculated based on the beam azimuth angle and the beam off-axis angle corresponding to the maximum signal strength.

In the embodiment of the present disclosure, a subtraction operation is performed between the beam azimuth angle corresponding to the maximum signal strength and the yaw angle of the array surface of the phased array antenna in the attitude reference frame of the inertial navigation device to acquire the azimuth compensation angle. A subtraction operation is performed between the beam off-axis angle corresponding to the maximum signal strength and the pitch angle of the array surface of the phased array antenna in the attitude reference frame of the inertial navigation device to acquire the pitch compensation angle.

S8. Based on the azimuth compensation angle and the pitch compensation angle, the phased array antenna is driven to aim the satellite.

In the embodiment of the present disclosure, the azimuth compensation angle and the pitch compensation angle acquired in step S7 are sent to the azimuth motor and the pitch motor respectively. The azimuth motor and the pitch motor drive the array surface of the phased array antenna to move by the azimuth compensation angle and the pitch compensation angle respectively, such that the phased array antenna is aimed at the satellite.

Embodiment 2

The embodiment of the present disclosure provides a whole-airspace satellite search device based on a phased array antenna, for implementing the whole-airspace satellite search method based on a phased array antenna according to Embodiment 1.

In the embodiment of the present disclosure, the whole-airspace satellite search device may be an electronic device, including a memory, a processor, and a computer program stored in the memory and executable on the processor. The processor executes the computer program to implement part or all of the steps of the whole-airspace satellite search method based on a phased array antenna according to Embodiment 1.

In the embodiment of the present disclosure, the electronic device may include a processor, a memory, a bus, and a communication bus. The communication interface and the memory are connected through the bus. The memory stores a computer program executable on the processor. The processor executes the computer program to implement part or all of the steps of the whole-airspace satellite search method based on a phased array antenna according to Embodiment 1.

In the embodiment of the present disclosure, the whole-airspace satellite search device may be a computer-readable storage medium. The computer-readable storage medium stores a computer program. The computer program is executed to implement part or all of the steps of the whole-airspace satellite search method based on a phased array antenna according to Embodiment 1.

The computer-readable storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disc. The computer-readable storage medium may be any available medium that can be accessed by a general-purpose or special-purpose computer. The computer-readable storage medium is coupled to the processor, such that the processor can read information from the computer-readable storage medium and write information into the computer-readable storage medium. The computer-readable storage medium may alternatively be a component of the processor. The processor and the computer-readable storage medium may be located in an application-specific integrated circuit (ASIC). The processor and the computer-readable storage medium may also exist as discrete components in a point cloud registration system.

The embodiments of the present disclosure may be provided as a method, a device or a computer program product. Therefore, the embodiments of the present disclosure may be in a form of hardware only embodiments, software only embodiments, or embodiments with a combination of software and hardware. Moreover, the present disclosure may use a form of a computer program product that is implemented on one or more computer-usable storage media (including but not limited to a magnetic disk memory, a compact disc read-only memory (CD-ROM), an optical memory, and the like) that include computer-usable program code. The present disclosure is described with reference to the flowcharts and/or block diagrams of the method, the device (apparatus), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be stored in a computer-readable memory that can instruct a computer or another programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams. These computer program instructions may also be loaded onto the computer or other programmable data processing devices, such that a series of operating steps are performed on the computer or other programmable devices to generate computer-implemented processing, and instructions executed on the computer or other programmable devices provide steps for implementing the functions specified in the one or more flows of the flowchart and/or one or more blocks in the block diagram.

Those of ordinary skill in the art will understand that the embodiments described herein are intended to help readers understand the principles of the present disclosure, and it should be understood that the protection scope of the present disclosure is not limited to such special statements and embodiments. Those of ordinary skill in the art may make other various specific modifications and combinations according to the technical teachings disclosed in the present disclosure without departing from the essence of the present disclosure, and such modifications and combinations still fall within the protection scope of the present disclosure.

What is claimed is:

1. A whole-airspace satellite search method based on a phased array antenna, comprising the following steps:
    S1: initializing the phased array antenna, and controlling an array surface of the phased array antenna to a horizontal direction;
    S2: calculating an angle to aim a satellite at a place where the phased array antenna is located;
    S3: combining attitude data of the array surface of the phased array antenna; and calculating, based on the angle to aim the satellite at the place where the phased array antenna is located, a beam angle of the phased array antenna;
    S4: deploying the phased array antenna based on the beam angle; determining whether the phased array antenna receives a valid signal; if yes, proceeding to step S6; and if not, proceeding to step S5;
    S5: controlling the phased array antenna to perform an offset scanning, and returning to step S3;
    S6: recording a beam azimuth angle and a beam off-axis angle corresponding to a maximum signal strength, and proceeding to step S7;
    S7: calculating an azimuth compensation angle and a pitch compensation angle based on the beam azimuth angle and the beam off-axis angle corresponding to the maximum signal strength; and
    S8: driving, based on the azimuth compensation angle and the pitch compensation angle, the phased array antenna to aim the satellite;
    wherein step S5 comprises the following sub-steps:
    S51: offsetting a pitch angle by multiple beam widths;
    S52: controlling the phased array antenna for an electronic 360° azimuth scanning;
    S53: determining whether the valid signal is scanned by preset n times of the electronic 360° azimuth scanning; if yes, returning to step S3; and if not, proceeding to step S54; and
    S54: controlling a pitch motor to raise the array surface of the phased array antenna to 45°; controlling an azimuth motor to rotate 360° for the electronic 360° azimuth scanning to perform a whole-airspace scanning; and returning to step S3 if the valid signal is scanned.

2. The whole-airspace satellite search method based on the phased array antenna according to claim 1, wherein in step S2, the angle to aim the satellite at the place where the phased array antenna is located comprises an azimuth angle $\varphi_0$, a pitch angle $\theta_0$, and a polarization angle $\rho_0$:

$$\varphi_0 = 180° + \tan^{-1}\left(\frac{\tan(\lambda_s - \lambda_e)}{\sin\varphi_e}\right) \tan^{-1}\left(\frac{\cos(\lambda_s - \lambda_e)\cos\varphi_e - \frac{R_e}{R_e + H}}{\sqrt{1 - (\cos(\lambda_s - \lambda_e)\cos\varphi_e)^2}}\right)(-1)\left(\frac{\sin(\lambda_s - \lambda_e)}{\tan\varphi_e}\right)$$

enotes a longitude of the phased array antenna; $\varphi_e$ denotes a latitude of the phased array antenna; $R_e$ denotes an average radius of the Earth; and H denotes a distance of the satellite from a surface of the Earth.

3. The whole-airspace satellite search method based on the phased array antenna according to claim 2, wherein step S3 comprises the following sub-steps:
    fixing an inertial navigation device on the array surface of the phased array antenna, and acquiring the attitude data of the array surface of the phased array antenna in an attitude reference frame of the inertial navigation device, comprising a roll angle α, a pitch angle β, and a yaw angle γ;
    calculating, based on the attitude data of the array surface of the phased array antenna in the attitude reference frame of the inertial navigation device, a pointing angle of an aiming beam; and
    converting the pointing angle of the aiming beam into the beam angle of the phased array antenna.

4. The whole-airspace satellite search method based on the phased array antenna according to claim 3, wherein the step of calculating, based on the attitude data of the array surface of the phased array antenna in the attitude reference frame of the inertial navigation device, a pointing angle of an aiming beam, comprises the following sub-steps:
    converting the attitude data of the array surface of the phased array antenna in the attitude reference frame of the inertial navigation device into attitude data in a north-east-down (NED) frame according to the following rotation matrixes:

$$C_x(\alpha) = \begin{bmatrix} 1 & 0 & 0 \\ 0 & \cos\alpha & \sin\alpha \\ 0 & -\sin\alpha & \cos\alpha \end{bmatrix}$$

$$C_y(\beta) = \begin{bmatrix} \cos\beta & 0 & -\sin\beta \\ 0 & 1 & 0 \\ \sin\beta & 0 & \cos\beta \end{bmatrix}$$

$$C_z(\gamma) = \begin{bmatrix} \cos\gamma & \sin\gamma & 0 \\ -\sin\gamma & \cos\gamma & 0 \\ 0 & 0 & 1 \end{bmatrix}$$

x(α)(γ)s around an x-axis, a y-axis, and a z-axis, respectively;
    acquiring, based on the attitude data of the array surface of the phased array antenna in the NED frame, an attitude vector of the array surface of the phased array antenna in the NED frame;
    acquiring, by a satellite locator, a current position of the array surface of the phased array antenna; and acquiring, based on the current position of the array surface of the phased array antenna, a first coordinate vector a of the array surface of the phased array antenna in a geocentric coordinate system;
    acquiring, by a satellite communications on a move (SOTM) modem, a current position of a target satellite; and acquiring, based on the current position of the target satellite, a second coordinate vector $\vec{b}$ of the target satellite in the geocentric coordinate system;

calculating, based on the first coordinate vector a and the second coordinate vector $\vec{b}$, a target vector $\vec{c}=\vec{b}-\vec{a}$;

performing, based on the attitude vector of the array surface of the phased array antenna in the NED frame, a coordinate transformation on the target vector c to acquire a pitch angle error value Δβ and a yaw angle error value Δγ to be adjusted by the phased array antenna; and performing, based on the pitch angle error value Δβ and the yaw angle error value Δγ, an error reduction control on a pitch motor and an azimuth motor, respectively; and updating to acquire the pointing angle of the aiming beam.

5. The whole-airspace satellite search method based on the phased array antenna according to claim 3, wherein step S7 further comprises: performing a subtraction operation between the beam azimuth angle corresponding to the maximum signal strength and a yaw angle of the array surface of the phased array antenna in an attitude reference frame of an inertial navigation device to acquire the azimuth compensation angle; and performing the subtraction operation between the beam off-axis angle corresponding to the maximum signal strength and a pitch angle of the array surface of the phased array antenna in the attitude reference frame of the inertial navigation device to acquire the pitch compensation angle.

6. The whole-airspace satellite search method based on the phased array antenna according to claim 4, wherein in the step of performing, based on the pitch angle error value Δβ and the yaw angle error value Δγ, an error reduction control on a pitch motor and an azimuth motor, respectively and updating to acquire the pointing angle of the aiming beam, the pointing angle of the aiming beam comprises an azimuth angle $\varphi_1$ and a pitch angle $\theta_1$ of the phased array antenna in the NED frame:

$$\varphi_1=\varphi_0+\Delta\gamma$$

$$\theta_1=\theta_0+\Delta\beta.$$

7. The whole-airspace satellite search method based on the phased array antenna according to claim 6, wherein in the step of converting the pointing angle of the aiming beam into the beam angle of the phased array antenna, the beam angle of the phased array antenna comprises an azimuth angle $\varphi_2$, a pitch angle $\theta_2$, and a polarization angle $\rho_2$:

$$\varphi_2 = \varphi_1$$

$$\theta_2 = \theta_1$$

$$\rho_2 = \arctan\left(\frac{\sin\rho_n}{\cos\theta_2 \cdot \cos\rho_n}\right)$$

wherein $\rho_n$ denotes a polarization angle of the phased array antenna in a normal direction.

8. The whole-airspace satellite search method based on the phased array antenna according to claim 1, wherein step S54 further comprises: calculating a width $\theta_{Bw}$ of a scanning angle at different off-axis angles during the whole-airspace scanning:

$$\varphi_2 = \varphi_1$$

$$\theta_2 = \theta_1$$

$$\rho_2 = \arctan\left(\frac{\sin\rho_n}{\cos\theta_2 \cdot \cos\rho_n}\right)$$

$$\theta_{Bw} = \frac{k\lambda}{Nd \cdot \cos\psi}$$

wherein k denotes a beam width factor; λ denotes a wavelength; N denotes a number of array elements in the phased array antenna; d denotes a center distance between two array elements; and ψ denotes an off-axis angle of the phased array antenna; and calculating a width $r_1$ of the scanning angle at different yaw angles:

$r_1=a\cdot b\sqrt{a^2\sin^2\gamma+b^2\cos^2\gamma}$ γ denote lengths of two axes of an ellipse formed by fitting the multiple beam widths; and γ denotes a yaw angle of the phased array antenna.

9. A whole-airspace satellite search device based on a phased array antenna, for implementing the whole-airspace satellite search method based on the phased array antenna according to claim 1.

10. The whole-airspace satellite search device based on the phased array antenna according to claim 9, wherein in step S2 of the whole-airspace satellite search method based on the phased array antenna, the angle to aim the satellite at the place where the phased array antenna is located comprises an azimuth angle $\varphi_0$, a pitch angle $\theta_0$, and a polarization angle $\rho_0$:

$$\varphi_0 = 180° +$$

$$\tan^{-1}\left(\frac{\tan(\lambda_s-\lambda_e)}{\sin\varphi_e}\right)\tan^{-1}\left(\frac{\cos(\lambda_s-\lambda_e)\cos\varphi_e-\frac{R_e}{R_e+H}}{\sqrt{1-(\cos(\lambda_s-\lambda_e)\cos\varphi_e)^2}}\right)(-1)\left(\frac{\sin(\lambda_s-\lambda_e)}{\tan\varphi_e}\right)$$

enotes a longitude of the phased array antenna; $\varphi_e$ denotes a latitude of the phased array antenna; $R_e$ denotes an average radius of the Earth; and H denotes a distance of the satellite from a surface of the Earth.

11. The whole-airspace satellite search device based on the phased array antenna according to claim 9, wherein in the whole-airspace satellite search method based on the phased array antenna, step S54 further comprises: calculating a width $\theta_{Bw}$ of a scanning angle at different off-axis angles during the whole-airspace scanning:

$$\theta_{Bw} = \frac{k\lambda}{Nd \cdot \cos\psi}$$

wherein k denotes a beam width factor; λ denotes a wavelength; N denotes a number of array elements in the phased array antenna; d denotes a center distance between two array elements; and ψ denotes an off-axis angle of the phased array antenna; and calculating a width $r_1$ of the scanning angle at different yaw angles:

$r_1=a\cdot b\sqrt{a^2\sin^2\gamma+b^2\cos^2\gamma}$ γ denote lengths of two axes of an ellipse formed by fitting the multiple beam widths; and γ denotes a yaw angle of the phased array antenna.

12. The whole-airspace satellite search device based on the phased array antenna according to claim 10, wherein in the whole-airspace satellite search method based on the phased array antenna, step S3 comprises the following sub-steps:

fixing an inertial navigation device on the array surface of the phased array antenna, and acquiring the attitude data of the array surface of the phased array antenna in an attitude reference frame of the inertial navigation device, comprising a roll angle α, a pitch angle β, and a yaw angle γ;

calculating, based on the attitude data of the array surface of the phased array antenna in the attitude reference frame of the inertial navigation device, a pointing angle of an aiming beam; and converting the pointing angle of the aiming beam into the beam angle of the phased array antenna.

13. The whole-airspace satellite search device based on the phased array antenna according to claim 12, wherein in the whole-airspace satellite search method based on the phased array antenna, the step of calculating, based on the attitude data of the array surface of the phased array antenna in the attitude reference frame of the inertial navigation device, a pointing angle of an aiming beam, comprises the following sub-steps:

converting the attitude data of the array surface of the phased array antenna in the attitude reference frame of the inertial navigation device into attitude data in a north-east-down (NED) frame according to the following rotation matrixes:

$$C_x(\alpha) = \begin{bmatrix} 1 & 0 & 0 \\ 0 & \cos\alpha & \sin\alpha \\ 0 & -\sin\alpha & \cos\alpha \end{bmatrix}$$

$$C_y(\beta) = \begin{bmatrix} \cos\beta & 0 & -\sin\beta \\ 0 & 1 & 0 \\ \sin\beta & 0 & \cos\beta \end{bmatrix}$$

$$C_z(\gamma) = \begin{bmatrix} \cos\gamma & \sin\gamma & 0 \\ -\sin\gamma & \cos\gamma & 0 \\ 0 & 0 & 1 \end{bmatrix}$$

x(α)(γ)s around an x-axis, a y-axis, and a z-axis, respectively;

acquiring, based on the attitude data of the array surface of the phased array antenna in the NED frame, an attitude vector of the array surface of the phased array antenna in the NED frame;

acquiring, by a satellite locator, a current position of the array surface of the phased array antenna; and acquiring, based on the current position of the array surface of the phased array antenna, a first coordinate vector a of the array surface of the phased array antenna in a geocentric coordinate system;

acquiring, by a satellite communications on a move (SOTM) modem, a current position of a target satellite; and acquiring, based on the current position of the target satellite, a second coordinate vector $\vec{b}$ of the target satellite in the geocentric coordinate system;

calculating, based on the first coordinate vector a and the second coordinate vector $\vec{b}$, a target vector $\vec{c} = \vec{b} - \vec{a}$;

performing, based on the attitude vector of the array surface of the phased array antenna in the NED frame, a coordinate transformation on the target vector $\vec{c}$ to acquire a pitch angle error value Δβ and a yaw angle error value Δγ to be adjusted by the phased array antenna; and performing, based on the pitch angle error value Δβ and the yaw angle error value Δγ, an error reduction control on a pitch motor and an azimuth motor, respectively; and updating to acquire the pointing angle of the aiming beam.

14. The whole-airspace satellite search device based on the phased array antenna according to claim 12, wherein in the whole-airspace satellite search method based on the phased array antenna, step S7 further comprises: performing a subtraction operation between the beam azimuth angle corresponding to the maximum signal strength and a yaw angle of the array surface of the phased array antenna in an attitude reference frame of an inertial navigation device to acquire the azimuth compensation angle; and performing the subtraction operation between the beam off-axis angle corresponding to the maximum signal strength and a pitch angle of the array surface of the phased array antenna in the attitude reference frame of the inertial navigation device to acquire the pitch compensation angle.

15. The whole-airspace satellite search device based on the phased array antenna according to claim 13, wherein in the whole-airspace satellite search method based on the phased array antenna, in the step of performing, based on the pitch angle error value Δβ and the yaw angle error value Δγ, an error reduction control on a pitch motor and an azimuth motor, respectively, and updating to acquire the pointing angle of the aiming beam, the pointing angle of the aiming beam comprises an azimuth angle $\varphi_1$ and a pitch angle $\theta_1$ of the phased array antenna in the NED frame:

$\varphi_1 = \varphi_0 + \Delta\gamma$ $\theta_1 = \theta_0 + \Delta\beta$.

16. The whole-airspace satellite search device based on the phased array antenna according to claim 15, wherein in the whole-airspace satellite search method based on the phased array antenna, in the step of converting the pointing angle of the aiming beam into the beam angle of the phased array antenna, the beam angle of the phased array antenna comprises an azimuth angle $\varphi_2$, a pitch angle $\theta_2$, and a polarization angle $\rho_2$:

$$\varphi_2 = \varphi_1$$

$$\theta_2 = \theta_1$$

$$\rho_2 = \arctan\left(\frac{\sin\rho_n}{\cos\theta_2 \cdot \cos\rho_n}\right)$$

wherein $\rho_n$ denotes a polarization angle of the phased array antenna in a normal direction.

* * * * *